Patented Sept. 15, 1925.

1,553,415

UNITED STATES PATENT OFFICE.

GEORGE D. VAN ARSDALE, OF LOS ANGELES, CALIFORNIA, ASSIGNOR TO INSPIRATION CONSOLIDATED COPPER COMPANY, OF NEW YORK, N. Y., A CORPORATION OF MAINE.

METHOD OF CONTROLLING FERRIC IRON.

No Drawing.    Application filed May 18, 1925.    Serial No. 630,970.

*To all whom it may concern:*

Be it known that I, GEORGE D. VAN ARSDALE, a citizen of the United States, residing at Los Angeles, in the county of Los Angeles and State of California, have invented new and useful Improvements in Methods of Controlling Ferric Iron, of which the following is a specification.

My present invention is a method of controlling ferric iron, and is especially suitable to processes of copper recovery involving a leaching and a subsequent electrolysis; and it is a general object of this invention to improve the efficiency and the economy of processes of the general character indicated.

The question of the control of ferric iron in operations involving the leaching of ores or concentrates and the subsequent deposition of copper has been a very important one, for the reason that all commercially leachable ores yield solutions carrying more or less iron. Thus iron, whether dissolved from the ores or originally introduced with the solutions employed for leaching, is present during the operation of electrolysis, and becomes oxidized to ferric iron; and the presence of ferric iron has been regarded as having a seriously detrimental effect on cathode deposition efficiency.

It is known that, in processes in which the solvent action of ferric iron on copper compounds is not made use of in subsequent leaching operations, this ferric iron, as produced during electrolysis, may be continuously reduced, e. g. during electrolysis, to the ferrous condition, in which condition it has no detrimental effect upon an electro-deposition of copper, such continuous reduction being sometimes effected by the use of sulfur dioxid or by other methods. In these known methods, the balance of iron from cycle to cycle with respect to the copper dissolved needs to be controlled only in such a way as to prevent an accumulation of total iron; and this is commonly done by discharging a portion of the main solution and treating the same for copper recovery by other methods than electrolysis.

In methods where the solvent action of ferric iron is purposely made use of as a part of the process, further complications of control become necessary. In this case, the total amount of iron in solution is important, and this may be controlled in the manner referred to. When, however, the ferric iron is used as a solvent of, for example, sulfid compounds of copper, according to the equation:

$$CuS + Fe_2(SO_4)_3 \rightleftarrows CuSO_4 + 2FeSO_4 + S,$$

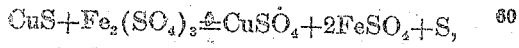

the actual quantity of iron present in the ferric condition is also of importance. In other words, conditions and operations ought to be so controlled that the amount of ferric iron produced during the electrolytic precipitation of copper shall be substantially equal to that needed, when the residual liquors are applied to a subsequent batch of ore, for the reaction with the reducing constituents of the ores so treated. It is thus an object of my present invention to perfect a genuinely cyclical economical method for the wet treatment of certain copper ores.

The methods of copper leaching to which this invention relates, are applicable to the so-called "mixed" ores of copper, these being ores in which a part of the copper is present as sulfid components and the remainder may be present as carbonates, silicates, oxids, or other acid-soluble or so-called "oxidized" components. The methods herein described are also applicable to ore or concentrates in which all of the copper occurs in the sulfid form. For convenience, I shall generally refer hereinafter to the mixed ores of copper, but it should be understood that such ores are referred to merely by way of example.

In the treatment of materials of the character referred to, the reducing actions of the constituents thereof upon ferric salts in solution will be variable. Generally speaking, the most important cause of such variation will be the differing relative proportions, from time to time, of the oxid constituents to the sulfid constituents in the materials treated. In straight sulfid ores there may also be variation in the amounts of reducing constituents, for example, pyrrhotite. It is obvious, therefore, that, in the treatment of ores by a cyclical method involving alternate production of ferric iron by electrolysis and its reduction to a ferrous form by action upon the ore, there may result either an excess of or a deficiency of ferric iron, such excess or deficiency becoming marked after a certain number of cycles unless there shall be adapted, to meet this difficulty, some method which will provide a means of meeting not only a constant excess or deficiency but also a variation from day to day; and it is an object of my invention to provide a new method of obviating the difficulty referred to.

The solutions which I use for carrying out my present invention may have a considerable variation of constituents other than iron salts. As to the iron salts, it has been indicated in the equation above that the usual leaching of mixed or sulfid copper ores by means of liquors containing ferric sulfate results in the formation of ferrous sulfate, and it is desirable that the amount of iron in the ferrous form should be, during the electrolysis which follows the leaching, sufficient to act as a depolarizing agent at the anode; and such depolarization is important in, for example, methods using anodes of either lead or graphite, or both. It will, moreover, be obvious that the amounts of ferric iron should in all cases be sufficient to provide a good solvent for use on the copper compounds leached. The ferric iron in the leach liquor may, for example, be as high as 1%, or even more; and ferrous iron should subsequently be present in the neighborhood of 1½%, or more, when the solutions are in use as electrolyte for the deposition of copper. It is accordingly an object of my invention to provide a process in which approximately the mentioned respective amounts of ferric and ferrous iron shall be present as required.

I have found that the case in which there is a net deficiency of ferric iron during the execution of a process of the general character herein described, may be met by making use of the oxidizing action of finely divided air brought into intimate contact with the solution. This oxidizing action of air is known and does not form a part of my present invention; although I may state that I have found the oxidizing efficiency of air, when properly applied, to be much greater than is usually supposed.

My present invention is directed to the opposite situation, in which an excess of ferric iron is produced; and I have discovered that this situation may be met in either of two ways, in one of which the total amount of iron is diminished, and in the other of which the total iron remains a constant. Either or both methods may be used; but, generally speaking, the first method may be more applicable to those ores which carry appreciable amounts of soluble iron components. It is thus one object of my present invention to provide controllable methods for the elimination of iron salts when an excess thereof may accumulate in the cyclic operation of processes of the general character above referred to; and a description of the first of these methods, is as follows:

*First method.*—It is well known that if solutions containing ferric iron are nearly or quite neutralized and then warmed, a part or all of the ferric iron precipitates as indefinite, more or less basic, iron salts. The neutralization of commercial leach liquors would, however, be inconvenient and impracticable, because of the time required and the cost of the acid lost thereby; and the open air heating of solutions carrying the usual amounts of free acid does not result in the separation of appreciable amounts of iron. I have, however, discovered that ferric iron components can be precipitated even from commercial leach liquors containing considerable amounts of free acid if only the liquors are kept under pressure, in any suitable apparatus, during the heating. The pressure required is only slight, but apparently some pressure is necessary; for the same solutions heated to the same temperature without pressure do not yield a precipitate. To meet the conditions of the problem, the precipitation of iron obviously should be subject to control, since the amount of the excess will be variable; and the amount separated by the method referred to may be varied by suitable changes in the conditions. I have found, for example, that the amount of iron which separates is more or less inversely proportional to the percentage of free acid present; and that it is approximately directly proportional to the temperature and the pressure. Under proper conditions, after washing, the precipitate is a relatively insoluble product consisting mainly of a basic sulfate or sulfates of iron, in which impurities, such as lime, may, in some cases, be present. If properly washed and if precipitated in the presence of sufficient free acid, the precipitate will carry no appreciable quantity of copper.

It is one of the objects of my invention to obviate the discarding of liquors which contain values; but obviously the foregoing method of controlling an excess of ferric iron will be of particular advantage where the ores being treated carry considerable amounts of acid-soluble iron. In the case of such ores, by my method involving the use of pressure, the amount of solution necessary to be discarded incidentally to the leaching of such ores may be considerably reduced, or such discarding may be entirely done away with.

In the case of ores in which the amount of acid-soluble iron is small, the application of my mentioned discovery regarding the use of pressure might result in an undue progressive diminution in the total iron present, it having already been indicated that the presence of ferrous iron formed in leach solutions is, in many cases, desirable by reason of its depolarizing action during subsequent electrolysis; but, when the presence of iron is not desired, my discovery regarding the effects of pressure during heating may be utilized to free the solution therefrom as completely as may be desired. Any convenient means and any convenient time may be employed for the heating of the liquor; but I prefer to apply pressure while the liquors retain a degree of heat which may have been imparted to them to complete the leaching of the ore.

My second method of controlling excess of ferric iron, which I will next describe, and which is especially suitable to cases in which the ore does not carry considerable quantities of soluble iron, depends upon the following facts. In electrolyzing by methods in which insoluble anodes of graphite are used in solutions carrying iron and copper, the anodic efficiency of conversion of ferrous to ferric iron is at least approximately equal to the efficiency of copper deposition at the cathode. That is to say, two molecules of iron are oxidized or brought into the ferric condition at the anode for each molecule of copper deposited at the cathode. This may be accomplished by such precautions as the employment of heat and circulation, whereby the voltage is kept low. Otherwise the anodic efficiency may be lower, a high voltage resulting from inefficient agitation, too high current density, or other causes. When the anodic efficiency is thus lowered, there may be danger of the disintegration of the graphite anode due to the free oxygen evolved.

With lead anodes the anodic oxidation efficiency of ferrous to ferric iron is less than when graphite is used, and the relative efficiency at the anode as compared with that at the cathode may be in the neighborhood of 60%; and anodic efficiency with lead anodes may also be varied by changing the current density, the temperature, and the rate of circulation or agitation, or all of these factors. Foregoing statements are also true of insoluble anodes other than those mentioned, and, accordingly, whenever, in this description or in defining this invention, lead is specified as an anodic material, it is to be understood that other equivalent anodes may be used, for example, compounds of iron and silicon.

*Second method.*—Making use of the above facts, I have discovered that, in the electrolysis of copper solutions, the amount of ferric iron produced by regeneration from the ferrous form may often be satisfactorily controlled by merely varying the proportion of graphite to other insoluble anodic material employed in the electrolysis. That is to say, when the excess of ferrous iron accumulating in successive cycles is not too great, as may often be the case when mixed or sulfid ores are treated, a suitable proportioning of the comparatively efficient graphite anodes with anodes of less efficiency, such as lead anodes, can be relied upon to keep the net ferric iron content constant for any number of leaching and electrolytic cycles, a gradually increasing fraction of the total iron content being meantime permitted to accumulate as ferrous iron.

In practical operation, the approximate reducing power of an ore body having been determined, I prefer to provide, in any suitable electrolytic tank house, a predetermined suitable proportion of tanks or cells with lead anodes and tanks or cells with graphite anodes, it being advantageous to provide an excess of, say lead anode tanks, of which a greater or a lesser number may be used, as variations in the ore may require; and even when the quantities of iron content in the ore are such as to result in a comparatively rapid increase in the iron content of the leach liquors, so that the use of my "first" method is economically justified, I may subsequently employ, in addition thereto and as a further refinement, my "second" above method for maintaining the desired ferric iron content of the regenerated leach liquor, the quantity of copper meantime recovered at the cathode with a given expenditure of electrical energy being practically unaffected by the character of the anode used.

The method of controlling ferric iron and its balance in successive cycles by varying the proportion of graphite and lead anodes may be more fully described as follows.

Graphite, as an anode, is very efficient, that is to say iron in solution in the ferrous condition is much more readily oxidized with a graphite anode than with a lead anode. One hundred percent utilization of the anodic oxidation effect is obtainable with graphite anodes. The anodic efficiency with lead anodes may be varied somewhat, but usually about 60% efficiency may be had with lead anodes. That is to say, of the oxygen set free at a lead anode 60% goes to oxidize ferrous iron in solution and the remaining 40% is either freed as such or goes to peroxidize the lead. Now let us assume an ore that has such a proportion of oxide and sulphide copper that ferric iron equivalent to 80% of the copper deposited is reduced by passing the leaching solution through the ore. Obviously, in such a case if we use all lead anodes, we would have a constant deficiency of ferric iron in each cycle, and if on the other hand all graphite was used with this particular ore, there would be a constant overproduction of ferric iron in each cycle, but if a proportion of half graphite at 100% and half lead at 60% efficiencies were used the net result would be an average 80% anode efficiency exactly corresponding to the 80% reduced by the ore, and the solutions would remain in balance with respect to the ferric iron. Other proportions may of course be used as the character of the ores require, and in some cases either all lead or all graphite may be necessary.

In the preparation for the treatment of an ore by steps involving my present invention I may treat a quantity of mixed ore, preferably dry-crushed to pass a quarter-inch mesh, with a suitable leach liquor; and this liquor may contain as much as 1% or more of ferric iron in the form of ferric sulfate, about 2% iron as ferrous sulfate, free sulfuric acid up to about 5%, and increasing quantities of copper sulfate up to about 4% of copper. I may bring the ore into contact with the successive portions of leach liquor preferably applied on the countercurrent principle, and preferably employing only so much heat, during the latter portion of the period of extraction, as may be necessary to an economical recovery of values by the method which I have set forth and justified in my copending application Ser. No. 639,969 filed May 18, 1923 (Case B), the total quantity of leach liquor being preferably kept approximately constant.

Assuming, then, that the iron content of the rich liquors obtained as above is such as may result in subsequent inconvenience, and proceeding in accordance with the principles outlined, my present invention may be exemplified by a subjecting of the rich liquors, by any convenient means, to additional heat and to pressure sufficient to effect, without a neutralization, a satisfactory precipitation of iron components therefrom, the most favorable degree of heat and pressure for any specific ores being best predetermined by practical experience.

By a suitable washing of the precipitate obtained as above, I may avoid any appreciable loss of copper therewith, all water containing values being preferably combined with the rich liquors and subjected to electrolysis for the deposition of copper and the regeneration of a leach liquor.

While the mentioned application of heat and pressure to effect a precipitation of iron may obviously be executed at any suitable point in the indicated cycle of operations, I prefer that such precipitation shall immediately precede the step of electrolysis, and in order to obviate the necessity for too close regulation during this application of heat and pressure, I may employ the above described "second" method to bring the liquor, during the deposition of copper therefrom, to exactly the preferred percentage of ferric iron by regeneration of the ferrous iron therein, the remaining iron being allowed to remain in the ferrous form or subsequently eliminated. For example, if the simultaneous use of, say, two cells containing graphite electrodes with, say, three cells containing lead electrodes, will result, upon an admixture of the residual liquor obtained therefrom, in a leach liquor containing the desired 1% or more of ferric iron that may be regarded as favorable to a complete extraction of copper from certain mixed ores, it is obvious that the best ratio of graphite anode cells to lead anode cells may be regarded as determined by the experimental results above supposed for purposes of illustration.

It will, of course, be understood by those skilled in the art that both of the described methods may be independently employed, and that various modifications may be made in either without departing from the spirit of my present invention as the same is indicated by the foregoing illustrative description and by the following claims.

What is claimed is:

1. In the recovery of copper from mixed copper ores containing iron, the step which consists in applying heat and pressure to effect a precipitation of iron from an acid solution.

2. In the recovery of copper from ores containing also iron, the step which consists in applying to a suitably warmed liquor sufficient pressure to precipitate an iron compound therefrom.

3. In the recovery of copper from ores containing also iron, the step which consists in concurrently employing dissimilar anodes in such proportion as to convert only a desired fraction of the iron content of a liquor undergoing electrolysis from a ferrous to a ferric form suitable for use in a subsequent leaching operation.

4. In the recovery of copper from ores containing also iron, the step which consists in applying to a suitably warmed liquor sufficient pressure to precipitate an iron compound therefrom, and then concurrently employing dissimilar anodes in such proportion as to convert a desired fraction of the iron content of a liquor undergoing electrolysis into a ferric form.

5. In the recovery of copper from a mixture containing iron by a cyclical process in which iron tends to accumulate, the step which consists in applying heat and pressure sufficient to effect a desired precipitation of iron, said precipitate being washable to avoid loss of values therewith.

6. In the recovery of copper from a mixture containing iron by a cyclical process in which iron tends to accumulate, the step which consists in applying heat and pressure sufficient to effect a desired precipitation of iron, said precipitate being washable to avoid loss of values therewith, and thereafter converting a desired proportion of iron from a ferrous to a ferric condition while effecting an electro-deposition of copper.

7. To effect without neutralization a precipitation of iron compounds from acid solutions containing the same, the method which consists in applying heat and pressure simultaneously thereto.

8. To control the extent of anodic oxidation effected during the cathodic electrodeposition of a metal, the method which consists in concurrently employing dissimilar anodes in a predetermined ratio.

In testimony whereof I have signed my name to this specification.

GEORGE D. VAN ARSDALE.